United States Patent
Gao

(10) Patent No.: US 11,413,663 B2
(45) Date of Patent: Aug. 16, 2022

(54) ULTRAVIOLET LIGHT CLEANING DEVICE

(71) Applicant: TCL CHINA STAR OPTOELECTRONICS TECHNOLOGY CO., LTD., Shenzhen (CN)

(72) Inventor: Pan Gao, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 477 days.

(21) Appl. No.: 16/615,320

(22) PCT Filed: Aug. 15, 2019

(86) PCT No.: PCT/CN2019/100688
§ 371 (c)(1),
(2) Date: Nov. 20, 2019

(87) PCT Pub. No.: WO2020/258461
PCT Pub. Date: Dec. 30, 2020

(65) Prior Publication Data
US 2021/0362202 A1 Nov. 25, 2021

(30) Foreign Application Priority Data
Jun. 26, 2019 (CN) .......................... 201910562312.4

(51) Int. Cl.
*B08B 7/00* (2006.01)
*G02F 1/01* (2006.01)
(52) U.S. Cl.
CPC .......... *B08B 7/0057* (2013.01); *G02F 1/0121* (2013.01)

(58) Field of Classification Search
CPC ........................... B08B 7/0057; G02F 1/0121
USPC .... 250/453.11, 454.11, 455.11, 493.1, 504 R
See application file for complete search history.

(56) References Cited

U.S. PATENT DOCUMENTS

| | | |
|---|---|---|
| 4,867,796 A | 9/1989 | Asmus |
| 2006/0249175 A1* | 11/2006 | Nowak ............... C23C 16/4405 134/1 |
| 2012/0138084 A1 | 6/2012 | Han et al. |
| 2013/0288488 A1 | 10/2013 | Wang et al. |

(Continued)

FOREIGN PATENT DOCUMENTS

| | | |
|---|---|---|
| CN | 1282277 A | 1/2001 |
| CN | 1306864 A | 8/2001 |

(Continued)

OTHER PUBLICATIONS

Rare Earth Containing Optical Glass (7 pages total).

*Primary Examiner* — Nicole M Ippolito
(74) *Attorney, Agent, or Firm* — JMB Davis Ben-David

(57) ABSTRACT

Disclosed is an ultraviolet (UV) light cleaning device. By providing an energy conversion component between an UV light source and a supporting platform, the UV light cleaning device can convert the energy of the UV light to specific energy by the energy conversion component. When the energy of the UV light is higher, the energy of the UV light is converted to specific energy lower than the energy of the UV light, thereby avoiding damage to the substrate while cleaning the substrate to solve the technical problem that the conventional UV light cleaning damages the substrate in a cleaning process.

19 Claims, 2 Drawing Sheets

(56) References Cited

U.S. PATENT DOCUMENTS

2013/0308929 A1    11/2013   Hsiao
2016/0228928 A1    8/2016   Yao

FOREIGN PATENT DOCUMENTS

| | | |
|---|---|---|
| CN | 201438241 U | 4/2010 |
| CN | 101885581 A | 11/2010 |
| CN | 102934199 A | 2/2013 |
| CN | 103210057 A | 7/2013 |
| CN | 103328609 A | 9/2013 |
| CN | 103422052 A | 12/2013 |
| CN | 103962346 A | 8/2014 |
| CN | 204479847 U | 7/2015 |
| CN | 107051979 A | 8/2017 |
| CN | 107966876 A | 4/2018 |
| CN | 108343871 A | 7/2018 |
| WO | 2010107720 A2 | 9/2010 |

* cited by examiner

ULTRAVIOLET LIGHT CLEANING DEVICE

CROSS-REFERENCE TO RELATED APPLICATIONS

This is the U.S. National Stage of International Patent Application No. PCT/CN2019/100688, filed Aug. 15, 2019, which in turn claims the benefit of Chinese Patent Application No. 201910562312.4, filed Jun. 26, 2019

FIELD OF INVENTION

The present invention relates to the display technical field, and in particular, to an ultraviolet light cleaning device.

BACKGROUND OF INVENTION

Ultraviolet (UV) cleaning technologies refer to removing organic substances adhered to surfaces using organic compounds by photosensitive oxidation. It is often necessary to irradiate surfaces of substrates to clean the surfaces of the substrates before coating and photoresist coating processes However, in some processes, when surfaces of substrates are cleaned with UV light, the surfaces of the substrates may be damaged due to high energy of UV light irradiation. For example, problems of damages to copper films may occur in the copper process, thereby causing display problems.

Accordingly, conventional UV light cleaning has a technical problem concerning damages to substrates in the cleaning process.

SUMMARY OF INVENTION

The present invention is to provide an ultraviolet (UV) light cleaning device to solve the technical problem concerning damages to substrates in the UV light cleaning process.

In order to solve the aforementioned problem, the present invention provides a UV light cleaning device, the UV light cleaning device including: a supporting platform for supporting a substrate; an UV light source for emitting UV light to clean the substrate; and an energy conversion component disposed between the UV light source and the supporting platform for converting energy of the UV light to specific energy.

In the UV light cleaning device provided by the present application, the energy conversion component includes a spectral modulation layer, and the spectral modulation layer is configured to reduce the energy of the UV light.

In the UV light cleaning device provided by the present application, the spectral modulation layer includes a conversion region and a transmission region, wherein the conversion region is configured to correspond to the UV light source when conversion of the energy of the UV light is required, and the transmission region is configured to correspond to the UV light source when the substrate is directly irradiated by the UV light, and projected areas of the conversion region and the transmission region on the supporting platform are larger than a projected area of the UV light source on the supporting platform.

In the UV light cleaning device provided by the present application, the energy conversion component further includes a driver assembly, and the driver assembly is connected to the spectral modulation layer, and the driver assembly is configured to drive the spectral modulation layer to move.

In the UV light cleaning device provided by the present application, the spectral modulation layer is attached to the driver assembly, and the spectral modulation layer is configured to move with the driver assembly.

In the UV light cleaning device provided by the present application, the energy conversion component further includes a control assembly, and the control assembly controls operation of the driver assembly when conversion of the UV light is required.

In the UV light cleaning device provided by the present application, the transmission region and the conversion region are provided with transparent material, and the transparent material of the conversion region is doped with rare earth complex.

In the UV light cleaning device provided by the present application, the transparent material includes at least one of polyurethane resin, ethylene-polyvinyl acetate copolymer, and organic glass.

In the UV light cleaning device provided by the present application, the rare earth complex includes a ligand and rare earth material, and the ligand is configured to absorb the energy of the UV light and to transfer the energy of the UV light to the rare earth material, and the rare earth material is configured to absorb the light emitting from the ligand and to emit non-UV light.

In the UV light cleaning device provided by the present application, the rare earth material includes at least one of yttrium, scandium, lanthanum and cerium.

In the UV light cleaning device provided by the present application, the ligand includes at least one of a delta electron, a pi electron, lone pair electrons, and a non-bonding n electron.

In the UV light cleaning device provided by the present application, a thickness of the transparent material ranges from 0.1 to 1 mm.

In the UV light cleaning device provided by the present application, a composition ratio of the rare earth complex in the conversion region ranges from 10% to 60%.

In the UV light cleaning device provided by the present application, the spectral modulation layer includes a first spectral modulation layer and a second spectral modulation layer, wherein the first spectral modulation layer is configured to convert the energy of the UV light to a first energy, and the second spectral modulation layer is configured to convert the energy of the UV light to a second energy.

In the UV light cleaning device provided by the present application, the energy conversion component further includes a selection assembly, and the selection assembly is configured to select the spectral modulation layer based on minimum energy for cleaning the substrate and maximum energy that the substrate can withstand.

In the UV light cleaning device provided by the present application, the first spectral modulation layer includes a first transparent material, and the first transparent material is doped with a first rare earth complex, and the second spectral modulation layer comprises a second transparent material, and the second transparent material is doped with a second rare earth complex, and the first transparent material is identical with the second transparent material, and the first rare earth complex is different from the second rare earth complex.

In the UV light cleaning device provided by the present application, type of the first rare earth complex is different from type of the second rare earth complex.

In the UV light cleaning device provided by the present application, a composition ratio of the first rare earth complex is different from a composition ratio of the second rare earth complex.

In the UV light cleaning device provided by the present application, a thickness of the first spectral modulation layer is different from a thickness of the second spectral modulation layer.

In the UV light cleaning device provided by the present application, composition of the first spectral modulation layer is identical with composition of the second spectral modulation layer.

The present invention provides a UV light cleaning device which includes a supporting platform, an UV light source and an energy conversion component. The supporting platform is used to support a substrate. The UV light source is used to emit UV light to clean the substrate. The energy conversion component is disposed between the UV light source and the supporting platform for converting the energy of the UV light to specific energy. By providing the energy conversion component between the UV light source and the supporting platform, the energy of the UV light can be converted to specific energy by the energy conversion component. When the energy of the UV light is higher, the energy of the UV light is converted to specific energy lower than the energy of the UV light, thereby avoiding damage to the substrate while cleaning the substrate to solve the technical problem that the conventional UV light cleaning damages the substrate in a cleaning process.

BRIEF DESCRIPTION OF THE DRAWINGS

To describe the technical solutions of the embodiments or the prior art more clearly, the following outlines briefly the accompanying drawings for describing the embodiments of the present invention or the prior art. Apparently, the accompanying drawings described below are merely about some embodiments of the present invention, and persons of ordinary skill in the art can derive other drawings from the accompanying drawings without any creative effort.

DETAILED DESCRIPTION OF EMBODIMENTS

Figure 1:
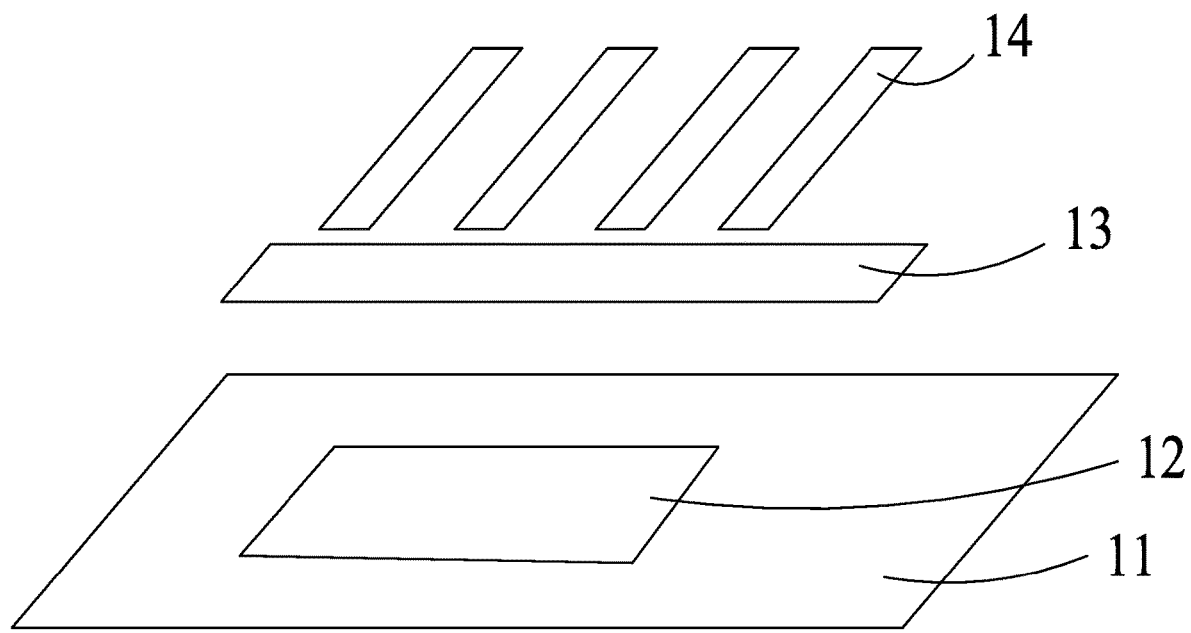
FIG. 1 is a first schematic view showing an UV light cleaning device provided by an embodiment of the present invention.

The following embodiments are referring to the accompanying drawings for exemplifying specific implementable embodiments of the present invention. Furthermore, directional terms described by the present invention, such as "upper", "lower", "front", "back", "left", "right", "inner", "outer", "side" and etc., are only directions by referring to the accompanying drawings, and thus the used directional terms are used to describe and understand the present invention, but the present invention is not limited thereto. In the drawings, structure-like elements are labeled with like reference numerals.

The present application is concerned with a technical problem of damage to a substrate using UV light in the cleaning process, and an embodiment of the present application is to solve the problem.

As shown in FIG. 1, the embodiment of the present application provides a UV light cleaning device which includes a supporting platform 11 for supporting a substrate 12, an UV light source 14 for emitting UV light to clean the substrate 12, and an energy conversion component 13 disposed between the UV light source 14 and the supporting platform 11 for converting energy of the UV light to specific energy.

An embodiment of the present invention provides a UV light cleaning device which includes a supporting platform, an UV light source and an energy conversion component. The supporting platform is used to support a substrate. The UV light source is used to emit UV light to clean the substrate. The energy conversion component is disposed between the UV light source and the supporting platform for converting the energy of the UV light to specific energy. By providing the energy conversion component between the UV light source and the supporting platform, the energy of UV light can be converted to specific energy by the energy conversion component. When the energy of the UV light is higher, the energy of the UV light is converted to specific energy lower than the energy of the UV light, thereby avoiding damage to the substrate while cleaning the substrate to solve the technical problem that the conventional UV light cleaning damages the substrate in a cleaning process.

It should be noted that the specific energy refers to the energy lower than energy of UV light or the energy higher than energy of UV light. A value of the specific energy is comprehensively determined based on the actual energy for cleaning the substrate and the actual energy causing damages to the substrate. For example, the specific energy is higher than the energy for cleaning the substrate and less than the energy causing damages to the substrate, and the specific energy includes energy of a particular light, such as energy of infrared light.

In an embodiment, the energy conversion component includes a spectral modulation layer disposed between the UV light source and the supporting platform for reducing the energy of the UV light. Taking damages to the substrate due to high-energy UV light in to account, the spectral modulation layer is disposed between the UV light source and the supporting platform in such a manner that when the UV light passes through the spectral modulation layer, the energy of the UV light would be reduced by the spectral modulation layer so as to emit low-energy light, thereby preventing the substrate from damage by the UV light.

Figure 2:
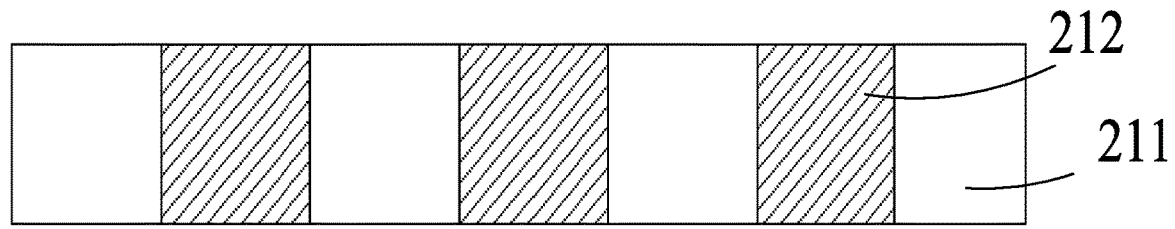
FIG. 2 is a schematic view showing a spectral modulation layer provided by an embodiment of the present invention.

In an embodiment, as shown in FIG. 2, the spectral modulation layer includes a conversion region 211 and a transmission region 212, wherein the conversion region 211 is configured to correspond to the UV light source when conversion of energy of UV light is required, and the transmission region 212 is used to correspond to the UV light source when the substrate is directly irradiated by UV light, and projected areas of the conversion region and the transmission region on the supporting platform are larger than a projected area of the UV light source on the supporting platform. When substrate cleaning is conducted, in consideration of the fact that energy of the UV light is capable of cleaning the substrate without damages to substrate, the spectral modulation layer is provided with a transmission region where the UV light passes and the UV light directly irradiates the substrate without altering the energy thereof. For the circumstance of damages to the substrate due to energy of UV light, the conversion region may be configured to correspond to the UV light source in such a manner that the energy of the UV light would be reduced when the UV light passes through the conversion region, and thereby the energy of the UV light passing through the conversion region would not damage the substrate In an embodiment, the energy conversion component further includes a driver assembly connected to the spectral modulation layer, and the driver assembly is configured to drive the spectral modulation layer to move. In order to implement the movements of the conversion region and the transmission region of the spectral modulation layer for the alignment of the conversion region or the transmission region with the UV light source, the spectral modulation layer may be configured to be connected to the driver assembly which is used to drive the spectral modulation layer to move.

In an embodiment, the driver assembly is fixed to the supporting platform, and the driver assembly is connected to the spectral modulation layer through a telescopic rod. The telescopic rod is driven to drive the spectral modulation layer to move in such a manner that the conversion region or the transmission region is aligned with the UV light source.

In an embodiment, the spectral modulation layer is attached to the driver assembly, and moves with the driver assembly. By disposing the driver assembly between the plane where the UV light source is located and the plane where the supporting platform is located, the driver assembly drives the spectral modulation layer to move, so that the conversion region or the transmission region of the spectral modulation layer is aligned with the UV light source. Moreover, the arrangement of the driver assembly is based on that the driver assembly would not affect irradiation of the UV light to the substrate. For example, the projection of the spectral modulation layer on the supporting platform is configured to be larger than the projection of the UV light source on the supporting platform, a portion of the spectral modulation layer exceeding the UV light source is configured to be attached to the driver assembly, and the projection of the driver assembly on the supporting platform is configured not to overlap the projection of the UV light source on the supporting platform, so that the driver assembly drives the spectral modulation layer to move, and thereby the driver assembly does not affect the irradiation of the UV light source to the substrate.

In an embodiment, the energy conversion component further includes a control assembly, and the control assembly is used to control operation of the driver assembly when conversion of the UV light is required. When conversion of the UV light is required, the driver assembly works under the control of the control assembly in such a manner that the driver assembly drives the spectral modulation layer to move, and thereby energy of UV light through the spectral modulation layer is converted to specific energy or directly passes through the spectral modulation layer.

In an embodiment, the transmission region and the conversion region are provided with transparent material, and the transparent material of the conversion region is doped with rare earth complex. By providing the transparent material at the transmission region, the UV light may directly pass through the spectral modulation layer to directly irradiate the substrate when the UV light source is aligned with the transmission region. By providing the transparent material at the conversion region and doping the rare earth complex in the transparent material, the energy of the UV light passing through the conversion region can be reduced to prevent the substrate from damages by the direct irradiation of the UV light to the substrate.

In an embodiment, the transparent material includes at least one of polyurethane resin, ethylene-polyvinyl acetate copolymer, and organic glass. Use of the transparent material not only enables the UV light to pass directly but also avoids foreign material contaminating the UV light source. The transparent material may be selected from radiation-resistant polymer material, or inorganic glass material with high light transmittance. The transparent material without affecting transmission of UV light is selected.

In an embodiment, the rare earth complex includes a ligand and rare earth material, and the ligand is configured to absorb energy of the UV light and to transfer energy of the UV light to the rare earth material, and the rare earth material is configured to absorb the light emitting from the ligand and to emit non-UV light. The rare earth complex is divided into the ligand and the rare earth material. By controlling the composition ratio of the rare earth material and the ligand, the spectral modulation layer can convert the energy of the UV light to energy of different light.

In an embodiment, the rare earth material includes at least one of yttrium, scandium, lanthanum and cerium. The rare earth material may be selected from at least one of yttrium, scandium and 15 metallic chemical elements of lanthanoid series.

In an embodiment, the ligand includes at least one of a delta electron, a pi electron, lone pair electrons, and a non-bonding n electron.

In an embodiment, a thickness of the transparent material ranges from 0.1 to 1 mm. By controlling the thickness range of the transparent material, the thickness of the transparent material is less to avoid blocking transmission of UV light.

In an embodiment, a composition ratio of the rare earth complex in the conversion region ranges from 10% to 60%.

Figure 3:
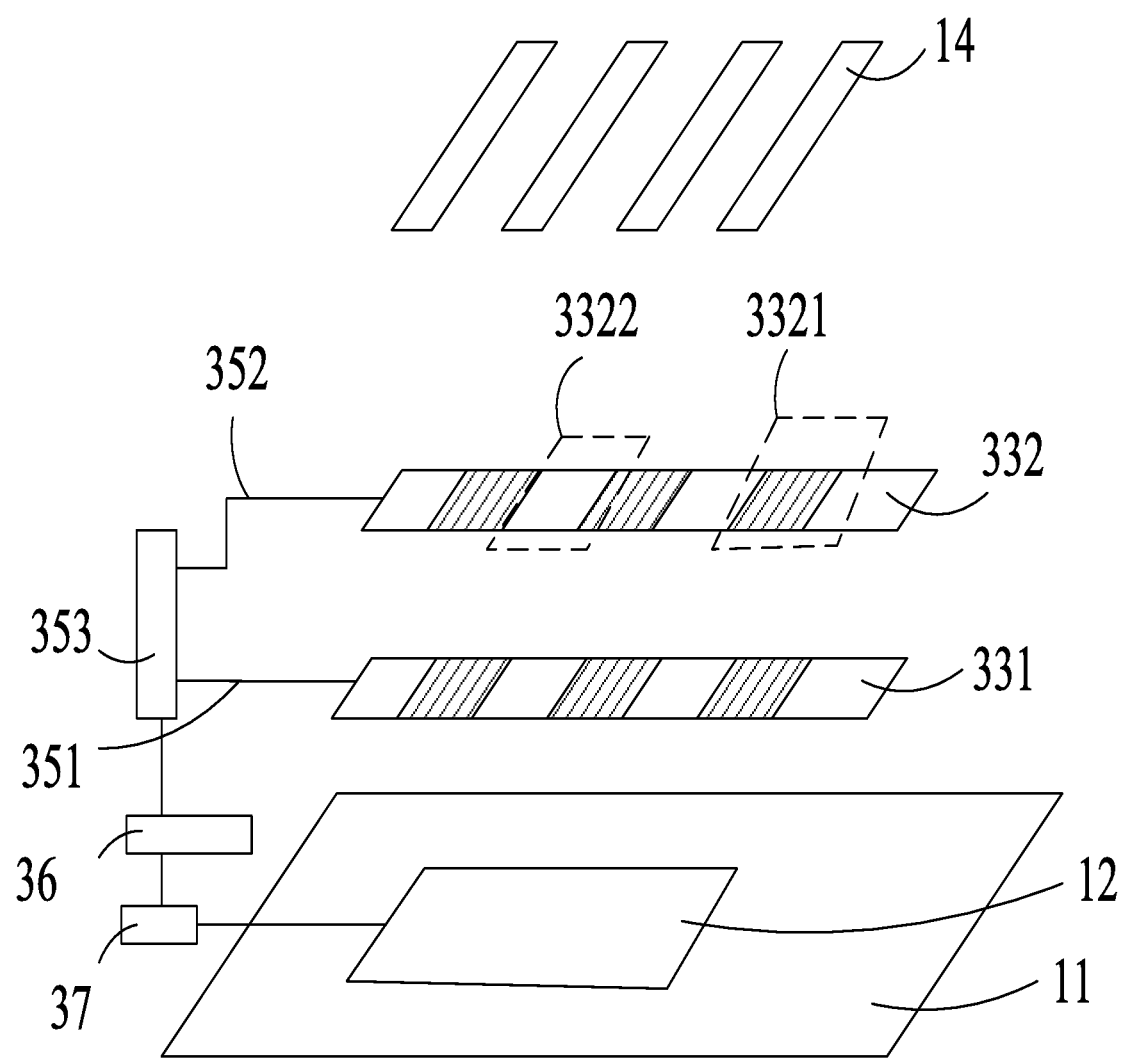
FIG. 3 is a second schematic view showing an UV light cleaning device provided by an embodiment of the present invention.

As shown in FIG. 3, an embodiment of the present application provides a UV light cleaning device which includes a supporting platform 11, a UV light source 14 and an energy conversion component. The supporting platform 11 is provided with a substrate 12. The energy conversion component includes a spectral modulation layer 33, a driver assembly 35, a control assembly 36 and a selection assembly 37. The selection assembly 37 is configured to select the spectral modulation layer 33 based on minimum energy for cleaning the substrate and maximum energy that the substrate can withstand. The spectral modulation layer 33 is connected to the driver assembly 35, the driver assembly 35 is connected to the control assembly 36, the control assembly 36 is connected to the selection assembly 37, and the selection assembly 37 is connected to the substrate 12.

It should be noted that the minimum energy for cleaning the substrate refers to the minimum energy that the UV light irradiates onto the substrate to clean the substrate. The maximum energy that the substrate can withstand refers to the minimum energy that destroys the substrate.

In an embodiment, as shown in FIG. 3, the spectral modulation layer 33 includes a first spectral modulation layer 331 and a second spectral modulation layer 332, wherein the first spectral modulation layer 331 is used to convert energy of UV light to a first energy, and the second spectral modulation layer 332 is used to convert energy of UV light to a second energy. Considering different energy is required for cleaning different substrates, the spectral modulation layer may be multiple layers, so that the different spectral modulation layers convert energy of UV light to different energy. For example, using the first spectral modulation layer to convert energy of UV light to a first energy when the first energy is required, and using the second spectral modulation layer to convert energy of UV light to a second energy when the second energy is required.

In an embodiment, the spectral modulation layer may be multiple layers, and converts energy of UV light by cooperation of the multiple spectral modulation layers. For example, the spectral modulation layer is configured as a first spectral modulation layer and a second spectral modulation layer which may be used respectively. The first spectral modulation layer and the second spectral modulation layer may also stack to work simultaneously for UV light conversion.

In an embodiment, as shown in FIG. 3, the selection assembly is used to store relevant data of the substrate, which includes but not limited to the minimum energy to clean the substrate and the maximum energy that the substrate can withstand. The selection assembly is connected to the substrate. After acquiring the size of the substrate, the selection assembly accesses data related to the minimum energy for cleaning substrate and the maximum energy that the substrate can withstand, and transmits the related data to the control assembly, and the control assembly controls the driver assembly to work, and the driver assembly drives the corresponding spectral modulation layer to move for the UV light conversion.

In an embodiment, as shown in FIG. 3, the driver assembly 35 includes a driver body 353, a first telescopic rod 351, and a second telescopic rod 352. The first telescopic rod 351 is connected to the first spectral modulation layer 331. When the first spectral modulation layer is required to be used, the first spectral modulation layer is driven to move using the first telescopic rod. The second telescopic rod 352 is connected to the second spectral modulation layer 332. When the second spectral modulation layer is required to be used, the second spectral modulation layer is driven to move using the second telescopic rod. Accordingly, the driver assembly may drive different spectral modulation layers to work based on the data from the selection assembly in such a manner that energy of UV light is converted to different energy to implement cleaning of different substrates and prevention of damages to the substrates.

In an embodiment, as shown in FIG. 3, the second spectral modulation layer 332 includes a conversion region 3321 and a transmission region 3322. The size and method of arrangement of a conversion region and a transmission region in the first spectral modulation layer are the same with the size and method of arrangement of a conversion region and a transmission region in the second spectral modulation layer. When the first spectral modulation layer is used correspondingly, the first spectral modulation layer may be moved in such a manner that the conversion region thereof may correspond to the UV light source while the second spectral modulation layer may be moved in such a manner that the transmission region thereof may correspond to the UV light source, so that the first spectral modulation layer is used for UV light conversion. When the second spectral modulation layer is used correspondingly, the first spectral modulation layer may be moved in such a manner that the transmission region thereof may correspond to the UV light source while the second spectral modulation layer may be moved in such a manner that the conversion region thereof may correspond to the UV light source. Accordingly, using the corresponding spectral modulation layer to convert the UV light for the corresponding substrate can be implemented by simply moving each spectral modulation layer and cooperation of the spectral modulation layers.

In an embodiment, the first spectral modulation layer includes a first transparent material, and the first transparent material is doped with a first rare earth complex, and the second spectral modulation layer comprises a second transparent material, and the second transparent material is doped with a second rare earth complex, and the first transparent material is identical with the second transparent material, and the first rare earth complex is different from the second rare earth complex. In order to use different spectral modulation layers for different substrates, same transparent material may be used when the spectral modulation layers are disposed, and different rare earth complexes are doped in the transparent material, so that the different spectral modulation layers for UV light conversion may be used for different substrates to ensure that the substrates are prevented from damages by the UV light while the UV light cleans the substrates.

In an embodiment, type of the first rare earth complex is different from type of the second rare earth complex. The energy obtained by conversion in the first spectral modulation layer is different from that in the second spectral modulation layer by doping different rare earth complexes in such a manner that the first spectral modulation layer and the second spectral modulation layer may be used relative to different substrates.

In an embodiment, a composition ratio of the first rare earth complex is different from a composition ratio of the second rare earth complex. Type of the first rare earth complex is configured to be identical with type of the second rare earth complex while a composition ratio of the first rare earth complex is different form a composition ratio of the second rare earth complex, so that the energy obtained by conversion of the UV light in the first spectral modulation layer is different from that in the second spectral modulation layer. Alternatively, type and a composition ratio of the first rare earth complex is different from those of the second rare earth complex, so that the energy obtained by conversion of the UV light in the first spectral modulation layer is different from that in the second spectral modulation layer.

In an embodiment, a thickness of the first spectral modulation layer is different from a thickness of the second spectral modulation layer. Composition of the first spectral modulation layer is configured to be identical with composition of the second spectral modulation layer. For example, type and a composition ratio of the rare earth complex in the first spectral modulation layer are identical with those in the second spectral modulation layer while a thickness of the first spectral modulation layer is different from a thickness of the second spectral modulation layer, so that the energy obtained by conversion of the UV light in the first spectral modulation layer is different from that in the second spectral modulation layer. Alternatively, a thickness and composition of the first spectral modulation layer are different from those of the second spectral modulation layer, and parameters of the first spectral modulation layer and the second spectral modulation layer are set according to demands, so that the energy obtained by conversion of the UV light in the first spectral modulation layer is different from that in the second spectral modulation layer.

In an embodiment of the present application, the UV light includes wavelengths of 172 nm, 185 nm, and 254 nm, but is not limited thereto.

According to the above embodiments, it can be known that: the present invention provides a UV light cleaning device which includes a supporting platform, an UV light source and an energy conversion component. The supporting platform is used to support a substrate. The UV light source is used to emit UV light to clean the substrate. The energy conversion component is disposed between the UV light source and the supporting platform for converting the energy of the UV light to specific energy. By providing the energy conversion component between the UV light source and the supporting platform, the energy of the UV light can be converted to specific energy by the energy conversion component. When the energy of the UV light is higher, the energy of the UV light is converted to specific energy lower than the energy of the UV light, thereby avoiding damage to the substrate while cleaning the substrate to solve the technical problem that the conventional UV light cleaning damages the substrate in a cleaning process.

In summary, although a few preferred embodiments of the present invention have been disclosed, the above preferred embodiments are not used for limiting this invention, and it will be understood by those of ordinary skill in the art that various changes in form and details may be made therein without departing from the spirit and scope of the present invention. The protection scope of the present invention is based on the scope of the appended claims.

What is claimed is:

1. An ultraviolet light (UV) cleaning device, comprising:
a supporting platform for supporting a substrate;
an UV light source for emitting UV light to clean the substrate; and
an energy conversion component disposed between the UV light source and the supporting platform for converting energy of the UV light to specific energy;
wherein the energy conversion component includes a spectral modulation layer, and the spectral modulation layer is configured to reduce the energy of the UV light.

2. The UV cleaning device of claim 1, wherein the spectral modulation layer includes a conversion region and a transmission region, wherein the conversion region is configured to correspond to the UV light source when conversion of the energy of the UV light is required, and the transmission region is configured to correspond to the UV light source when the substrate is directly irradiated by the UV light, and projected areas of the conversion region and the transmission region on the supporting platform are larger than a projected area of the UV light source on the supporting platform.

3. The UV cleaning device of claim 2, the energy conversion component further includes a driver assembly, and the driver assembly is connected to the spectral modulation layer, and the driver assembly is configured to drive the spectral modulation layer to move.

4. The UV cleaning device of claim 3, wherein the spectral modulation layer is attached to the driver assembly, and the spectral modulation layer is configured to move with the driver assembly.

5. The UV cleaning device of claim 4, wherein the energy conversion component further includes a control assembly, and the control assembly controls operation of the driver assembly when conversion of the UV light is required.

6. The UV cleaning device of claim 2, wherein the transmission region and the conversion region are provided with transparent material, and the transparent material of the conversion region is doped with rare earth complex.

7. The UV cleaning device of claim 6, wherein the transparent material includes at least one of polyurethane resin, ethylene-polyvinyl acetate copolymer, and organic glass.

8. The UV cleaning device of claim 6, wherein the rare earth complex includes a ligand and rare earth material, and the ligand is configured to absorb the energy of the UV light and to transfer the energy of the UV light to the rare earth material, and the rare earth material is configured to absorb the light emitting from the ligand and to emit non-UV light.

9. The UV cleaning device of claim 8, wherein the rare earth material includes at least one of yttrium, scandium, lanthanum and cerium.

10. The UV cleaning device of claim 8, wherein the ligand includes at least one of a delta electron, a pi electron, lone pair electrons, and a non-bonding n electron.

11. The UV cleaning device of claim 6, wherein a thickness of the transparent material ranges from 0.1 to 1 mm.

12. The UV cleaning device of claim 6, wherein a composition ratio of the rare earth complex in the conversion region ranges from 10% to 60%.

13. The UV cleaning device of claim 1, wherein the spectral modulation layer includes a first spectral modulation layer and a second spectral modulation layer, wherein the first spectral modulation layer is configured to convert the energy of the UV light to a first energy, and the second spectral modulation layer is configured to convert the energy of the UV light to a second energy.

14. The UV cleaning device of claim 13, wherein the energy conversion component further includes a selection assembly, and the selection assembly is configured to select the spectral modulation layer based on minimum energy for cleaning the substrate and maximum energy that the substrate can withstand.

15. The UV cleaning device of claim 13, wherein the first spectral modulation layer includes a first transparent material, and the first transparent material is doped with a first rare earth complex, and the second spectral modulation layer includes a second transparent material, and the second transparent material is doped with a second rare earth complex, and the first transparent material is identical with the second transparent material, and the first rare earth complex is different from the second rare earth complex.

16. The UV cleaning device of claim 15, wherein type of the first rare earth complex is different from type of the second rare earth complex.

17. The UV cleaning device of claim 15, wherein a composition ratio of the first rare earth complex is different from a composition ratio of the second rare earth complex.

18. The UV cleaning device of claim 13, wherein a thickness of the first spectral modulation layer is different from a thickness of the second spectral modulation layer.

19. The UV cleaning device of claim 18, wherein composition of the first spectral modulation layer is identical with composition of the second spectral modulation layer.

* * * * *